United States Patent [19]

Shelstad

[11] Patent Number: 5,129,508
[45] Date of Patent: Jul. 14, 1992

[54] DUST CONTROL SYSTEM

[76] Inventor: Keith Shelstad, 1111 Country Club Rd., Gillette, Wyo. 82716

[21] Appl. No.: 680,102
[22] Filed: Mar. 25, 1991
[51] Int. Cl.⁵ .............................................. B65G 21/00
[52] U.S. Cl. ................................. 198/860.3; 198/836.1
[58] Field of Search .................. 198/525, 860.3, 860.5, 198/836.1

[56] References Cited

U.S. PATENT DOCUMENTS

| | | | |
|---|---|---|---|
| 2,665,795 | 1/1954 | Holwick | 198/836.1 |
| 4,204,595 | 5/1980 | Marrs | 198/860.3 X |
| 4,269,614 | 5/1981 | Shelstad | 55/385.1 |
| 4,641,745 | 2/1987 | Skates | 198/836.1 |
| 4,874,082 | 10/1989 | Swinderman | 198/836.1 |

FOREIGN PATENT DOCUMENTS 0962130  9/1982  U.S.S.R. ............. 198/860.3

Primary Examiner—Joseph E. Valenza
Assistant Examiner—Tuan N. Nguyen
Attorney, Agent, or Firm—Don J. Flickinger; Jordan M. Meschkow; Lowell W. Gresham

[57] ABSTRACT

A generally L-shaped cowling attached to a hood of a conveyor apparatus partially defining a dead air space and having a clamping device attached thereto with a latch which is secured by a securing element for attaching a skirt.

16 Claims, 1 Drawing Sheet

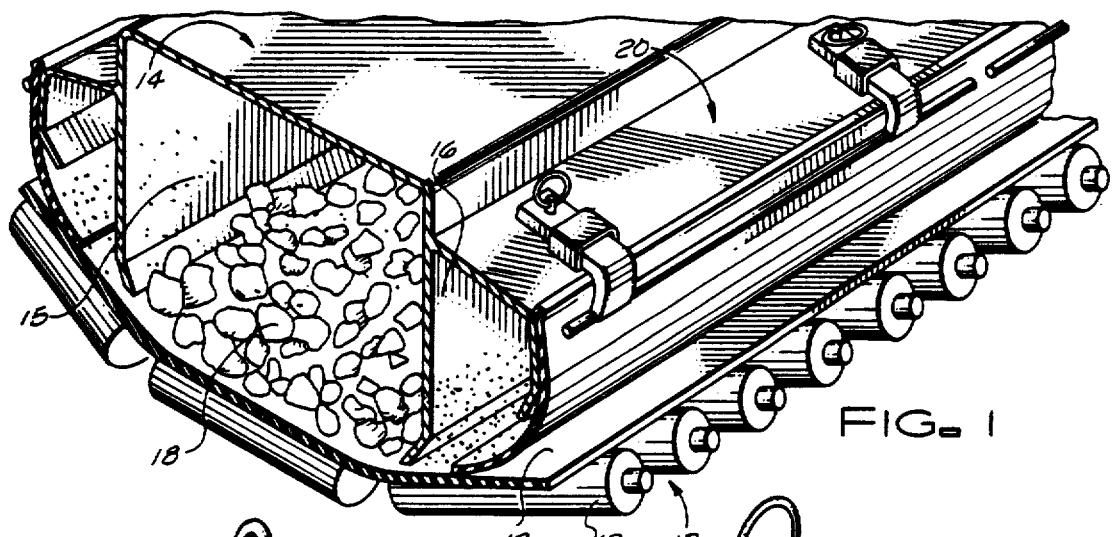
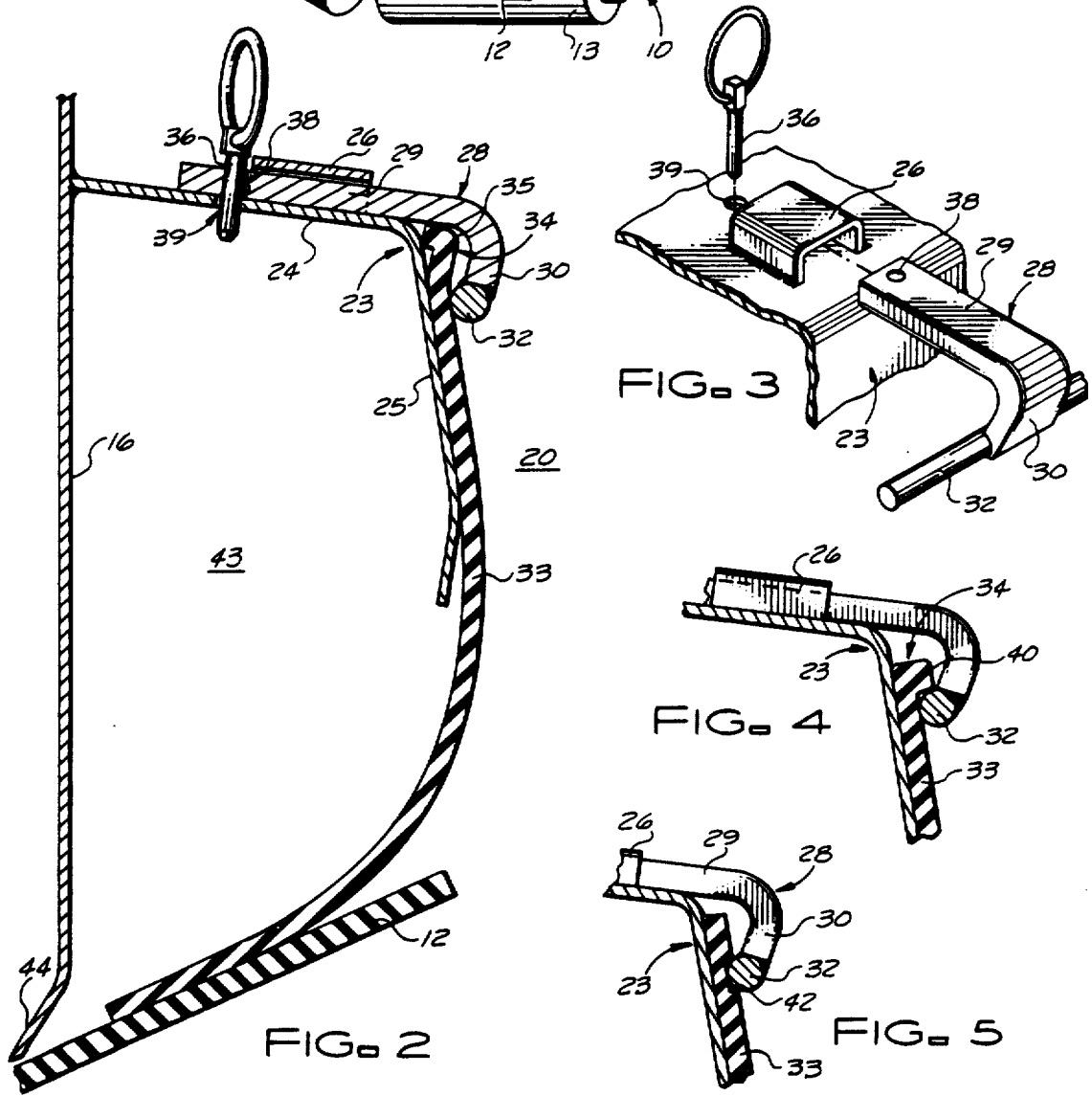

DUST CONTROL SYSTEM

BACKGROUND OF THE INVENTION

1. Field of the Invention

This invention relates to dust control systems. More particularly, the present invention relates to a skirtboard system which may be attached to the hood of a conveyor belt to reduce the amount of dust and fines which may escape from the hood.

2. Prior Art

Conveyor belts have long been used to move materials from one spot to another. When loose materials containing very small particles like dust and fines, such as sand, coal, and grain are moved, a system for containing these particles is required. The discharge of fines causes health and safety problems as well as economic ones. There is the loss of the material which may have some economic value, as well as the cost of cleaning up the material when it settles out of the atmosphere. Fines also constitute a long range health problem to workers who must breath the fines laden air. A more immediate danger is the explosive property of a fines laden atmosphere.

Systems for controlling fines usually consist of an overlying hood which reduces but does not eliminate discharge of dust and fines. This hood cannot rest directly on the moving belt, therefore, lateral discharge of dust and fines is not prevented. Systems are known and used which attach a skirt to the hood of a conveyor belt. The skirt is usually a pliable material that extends down to the belt. While these systems do reduce lateral discharge of dust and fines, they are relatively expensive and labor intensive. Most require continual adjusting to maintain proper positioning of the skirt in relation to the belt. The skirt holders are often bolted to the hood, requiring the system to be dismantled to give access to the inside of the hood when installing or adjusting the holders. Tools are required for the adjustment of and replacement of the skirt. Also, the skirt usually extends slightly under the hood. The material being moved may therefore come into contact with the skirt, increasing wear.

It would be highly advantageous, therefore, to remedy the foregoing and other deficiencies inherent in the prior art.

Accordingly, it is an object of the present invention to provide a new and improved skirtboard system for material advancing conveyor belts.

Another object of the present invention is to provide an inexpensive skirtboard system.

And another object of the present invention is to provide a skirtboard system which may be quickly and easily installed.

Still another object of the present invention is to prevent the escape of fines and dust into the atmosphere.

Yet another object of this invention is to dispense with the need for adjustments to the skirt.

Yet still another object of this invention is to reduce the wear on the skirt.

A further object of this invention is to help settle fines and dust onto the conveyor belt.

SUMMARY OF THE INVENTION

Briefly, to achieve the desired objects of the invention in accordance with the preferred embodiment thereof, provided is a skirtboard holder having a cowling coupled to the hood of a material advancing conveyor belt. A plurality of latches are slideably attached to the cowling by brackets and secured in place by a securing member. A skirt is held in place by the latches and comes into contact with the belt. A dead air space is formed between the hood and the cowling to help the fines settle back onto the conveyor belt. While only one skirtboard is described, it will be understood that the complete skirtboard system will have a skirtboard attached to each side of the conveyor belt.

BRIEF DESCRIPTION OF THE DRAWINGS

The foregoing and further and more specific objects and advantages of the instant invention will become readily apparent to those skilled in the art from the following detailed description of the preferred embodiment thereof taken in conjunction with the drawings in which:

FIG. 1 is a partial perspective view of the present invention attached to the hood of a conveyor belt;

FIG. 2 is a cut away side view of the present invention;

FIG. 3 is a partial perspective view of the clamping device;

FIG. 4 is a cut away side view of the clamping device, illustrating an alternate anchoring portion; and FIG. 5 is a cut away side view of the clamping device, illustrating a further embodiment of the anchoring portion.

DESCRIPTION OF THE PREFERRED EMBODIMENT

Turning now to the drawings in which like reference characters indicate corresponding elements throughout the several views, attention is first directed to Fig. 1 which illustrates a material advancing conveyor belt apparatus 10 which includes a belt 12 propelled by rollers 13. Conveyor belt 10 is well known and has long been used for advancing a material 18, such as sand, gravel, grain or coal. There are many other materials advanced by conveyor belts, however, those conveyor belts advancing materials having associated dust or fines are the concern of this invention. An inverted trough shaped hood 14, having substantially identical and opposing sides 15 and 16, is suspended over apparatus 10 and is also well known and used to help control dust. However, since hood 14 does not come into contact with belt 12, dust and fines can escape laterally from apparatus 10. A skirtboard system generally designated 20, which is the preferred embodiment of the present invention, is attached to side 16 of hood 14. Those skilled in the art will understand that a substantially identical skirtboard system will be attached to side 15, however, since it will be identical to skirtboard system 20 attached to side 16 it will not be discussed in detail.

Referring to FIG. 1, skirtboard system 20 consists of a skirtboard holder 22 having a cowling 23 which has a generally right angle cross section. Cowling 23 has an arm 24 extending outwardly from side 16. Cowling 23 also has a downturned arm 25 integral to and extending down from arm 24 substantially parallel to side 16. Cowling 23 extends along the length of and is attached to hood 14 by welding arm 23 to side 16 near its upper edge. Arm 24 may extend outward from side 16 at a slightly downward angle to prevent the collection of dust. Also, while arm 25 is substantially parallel to side 16, its lower edge may be slightly inturned. The reason for this will be discussed below. A plurality of brackets 26 are attached to arm 24 of cowling 23. Brackets 26 have an inverted U-shape and each act as a hold down slide for a latch 28. Each latch 28 has a first segment 29 which extends through bracket 26 flush with arm 24. A second segment 30 extends downward from first segment 29 and has a slight inward angle with respect to arm 25 of cowling 23. A bar 32, which extends the length of cowling 23, is coupled to the lower edge of second segment 30 of each latch 28. Each latch 28 with associated bar 32, forms a clamping device which clamps a skirt 33 against downturned arm 25.

Referring now to FIGS. 2 and 3 it can be seen that latch 28 is slideably engaged with cowling 23 by bracket 26. When each of latches 28 are extended outward, a gap is formed between bar 32 and arm 25. A skirt 33 can then be positioned between bar 32 and arm 25. In this embodiment skirt 33 extends downward from arm 24 and flush with arm 25. Skirt 33 extends down to belt 12 and then turns inward parallel to and in contact with belt 12 to just before the outer surface of side 16. The upper edge of skirt 33 has an anchor portion 34 which in this embodiment is an inwardly turned lip 35. In this embodiment skirt 33 is a ¼ inch thick piece of rubber 10 or 12 inches wide and extending the length of cowling 23. The skirt material may be any material used in conventional skirting. When latch 28 is slid inward towards side 16 anchor portion 34 is pressed between rod 32 and arm 25. As can be seen in FIG. 2, lip 35 cannot pass between bar 32 and arm 25 when latch 28 is secured in the inwardly slid position. Latch 28 is secured in the inwardly slid position by a securing element 36. Securing element 36 extends through a hole 38 defined by the end of first segment 29 and into a hole 39 defined by arm 24 of cowling 23. Hole 39 aligns with hole 38 when latch 28 is in the inwardly slid position. The use of securing element allows for quick, easy changes of skirt 33 without requiring tools.

Those skilled in the art will understand that securing element 36 may be a variety of elements, the preferred being a pin such as a lynch pin.

FIGS. 4 and 5 illustrate alternate anchor portions 34 of skirt 33. FIG. 4 shows anchor portion 34 as a lip 40 extending outward from the upper edge of skirt 33. When latch 28 is in the inwardly slid position lip 40 extends outward over rod 32 and is thus securely held in place. FIG. 5 illustrates another embodiment of anchor portion 34, consisting of a notch 42 cut into the upper edge of skirt 33. Using a notch 42 would reduce the time and expense required to prepare skirt 33 because a notch 42 can be constructed more quickly and inexpensively than the enlarged portion such as lips 35 and 40. Notch 42 functions in the same manner as lip 40. The edge of skirt 33 above notch 42 is enlarged relative to notch 42. Thus, when latch 28 is in the upwardly slid position, rod 32 fits into notch 42 and prevents the edge of skirt 33 above notch 42 from being withdrawn.

Referring back to FIG. 2, side 16, cowling 23 and skirt 33 form a dead air space 43. Dead air space 43 contains substantially motionless air, therefore, when fines enter from under side 16, they drop out of the air onto belt 12. Dead air space 43 is created by arm 25 which holds skirt 33 away from side 16. As described above, arm 25 is parallel to side 16 which creates the dead air space. The lower portion of arm 25 may be slightly inturned to allow skirt 33 to gradually turn inward parallel to belt 12. Material being advanced on belt 12 other than dust and fines is prevented from entering into dead air space 43 and contacting skirt 33 by a skirt protector 44. Skirt protector 44 is a slightly inturned lower edge of side 16. In this embodiment skirt protector 44 is inturned at a 20 degree angle and extends down to ⅜ inch above belt 12. Because protector 44 is so close to belt 12 large pieces of material are prevented from escaping underneath. The slope of protector 44 prevents material from being forced underneath, since the slope allows the press of material to be pushed up the inside of side 16 where it may then fall back onto belt 12. While in this embodiment protector 44 is integral to side 16, it will be understood that protector 44 may be a separate piece attached to side 16 by any conventional method, such as welding. Large pieces of material therefore, do not come into contact with skirt 33, thereby extending its life.

As described above, skirtboard system 20 is attached to side 15 as well as side 16. It will also be understood that skirtboard system 20 will be installed in segments of manageable length. While it may be possible to provide a skirtboard system 20 which extends the entire length of a conveyor apparatus, efficiency dictates that smaller segments of system 20 be installed and joined. The preferred embodiment employs sections of skirtboard system four foot long for ease in construction and installation. Each four foot section has three latches 28. It will be understood, however that longer segments may be constructed and more latches 28 may be used.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A skirtboard system comprising:
    a cowling adapted to be attached to a conveyor hood;
    a skirt;
    a plurality of brackets mounted on said cowling; and
    a plurality of clamping devices slideably engaged with said brackets and clamping said skirt sealingly against said cowling, each including;
    a generally L-shaped latch, a first segment of which is constructed to engage said bracket and a second segment of which extends downwardly from said first segment, and
    a rod attached adjacent said lower end of said second segment.

2. A skirtboard system as claimed in claim 1 wherein said cowling includes a first arm adapted to extend generally outwardly from said hood,
    and a second arm extending downwardly from said first arm to partially define a dead air space.

3. A skirt as claimed in claim 1 wherein said skirt includes an anchor portion adjacent the upper edge of said skirt.

4. A skirt as claimed in claim 3 wherein said anchor portion is a lip extending substantially the length of the upper edge of said skirt.

5. A skirt as claimed in claim 3 wherein said anchor portion includes an elongated groove extending substantially the length of said skirt adjacent the upper edge thereof.

6. A skirtboard system as claimed in claim 1 wherein the bracket includes an inverted U-shaped channel.

7. A skirtboard system as claimed in claim 1 wherein said clamping device further defines an opening adjacent the slideably engaged end of said first segment,
second openings defined by said cowling so as to be coaxially aligned with one of said first openings in said latch when in an inwardly slid position, and
a retaining element removably engaged through said coaxially opening.

8. A clamping device as claimed in claim 7 wherein said retaining element is a pin.

9. A clamping device as claimed in claim 7 wherein said retaining element is a lynch pin.

10. A dust control system used in combination with a conveyor belt apparatus comprising:
a conveyor belt;
a hood having opposing sides, suspended over said conveyor belt;
first and second skirtboard systems, each attached to one of said opposing sides of said hood, each of said skirtboard systems including
a cowling adapted to be attached to a conveyor hood;
a skirt;
a plurality of brackets mounted on said cowling;
a plurality of clamping devices slideably engaged with said brackets and clamping said skirt sealingly against said cowling, each having a generally L-shaped latch, a first segment of which is constructed to engage said bracket and a second segment of which extends downwardly from said first segment, and
a rod attached adjacent said lower end of said second segment.

11. A skirtboard system as claimed in claim 10 wherein said cowling includes a first arm adapted to extend generally outwardly from said hood, and
a second arm to partially define a dead air space.

12. A skirtboard system as claimed in claim 10 wherein the bracket includes an inverted U-shaped trough.

13. A skirtboard system as claimed in claim 10 wherein said clamping device further defines an opening adjacent the slideably engaged end of said first segment.

14. A dust control system as claimed in claim 10 wherein said skirtboard system is attached to said hood by welding.

15. A dust control system as claimed in claim 10 wherein a skirt protector extends from the lower edge of each opposing side of said hood.

16. A dust control system used in combination with a conveyor belt apparatus comprising:
a conveyor belt;
a hood having opposing sides with a skirt protector extending from the lower edges thereof suspended over said conveyor belt;
first and second skirtboard systems, each attached to one of said opposing sides of said hood, each of said skirtboard systems including
a cowling having a first arm welded to and extending generally outwardly from said hood, and
a second arm extending downwardly from said first arm to partially define a dead air space;
a skirt having an anchor portion adjacent the upper edge thereof;
a plurality of U-shaped channel brackets mounted on said cowling; and
a plurality of clamping devices slideably engaged with said brackets and clamping said skirt sealingly against said cowling, said clamping devices including:
a generally L-shaped latch, a first segment of which is constructed to engage said bracket and the second segment of which extends downwardly from said first segment,
a rod attached adjacent said lower end of said second segment,
an opening adjacent to and defined by the slideably engaged end of said first segment,
second openings defined by said first arm of said cowling so as to be coaxially aligned with one of said first openings in said latch when in an inwardly slid position, and
a retaining element removably engaged through said coaxial opening.

* * * * *